US011092457B1

(12) United States Patent
Jagannathan et al.

(10) Patent No.: US 11,092,457 B1
(45) Date of Patent: *Aug. 17, 2021

(54) SYSTEM AND METHOD FOR GENERATING AN ADDRESS INDICATOR FOR AN OBJECT BASED ON A LOCATION OF THE OBJECT

(71) Applicant: YoGeo, Inc., Cupertino, CA (US)

(72) Inventors: Sridhar Jagannathan, Los Altos, CA (US); Subrahmanyam Kavuri, Pune (IN); Narayan Laksham, Cupertino, CA (US)

(73) Assignee: YOGEO, Inc., Cupertino, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 16/589,013

(22) Filed: Sep. 30, 2019

Related U.S. Application Data

(63) Continuation-in-part of application No. 16/238,511, filed on Jan. 2, 2019, now Pat. No. 10,433,116.

(60) Provisional application No. 62/613,055, filed on Jan. 3, 2018.

(51) Int. Cl.
*H04W 4/029* (2018.01)
*G01C 21/36* (2006.01)
*G01C 21/32* (2006.01)
*H04L 29/08* (2006.01)

(52) U.S. Cl.
CPC ......... *G01C 21/3644* (2013.01); *G01C 21/32* (2013.01); *H04L 67/10* (2013.01)

(58) Field of Classification Search
CPC ....... H04W 4/029; H04W 4/027; G06F 16/29; H04L 67/1097
See application file for complete search history.

(56) References Cited

U.S. PATENT DOCUMENTS

| | | | | |
|---|---|---|---|---|
| 2002/0188581 | A1* | 12/2002 | Fortin | H04L 67/16 706/20 |
| 2010/0197219 | A1* | 8/2010 | Issa | H04W 4/029 455/3.06 |
| 2011/0087839 | A1* | 4/2011 | Sharma | G06F 16/29 711/118 |
| 2013/0088492 | A1* | 4/2013 | Jagadev | G06T 17/005 345/428 |
| 2015/0066962 | A1* | 3/2015 | Cortes | H04W 4/025 707/755 |
| 2018/0324546 | A1* | 11/2018 | Jones | G06F 16/951 |

* cited by examiner

*Primary Examiner* — Mazda Sabouri
(74) *Attorney, Agent, or Firm* — Raghunath S. Minisandram

(57) ABSTRACT

A system and method for associating an address for an object is disclosed. A smart address server is provided with a processor and memory. The smart address server is configured to receive a geo location for the object, the geo location indicative of the latitude and longitude of the location of the object. The geo location of the object is converted into a zone, sector, and target portion to generate a ZST location indicator for the object. An elevation portion is appended to the ZST location, to generate a ZSTE location indicator for the object. An object ID is assigned to the object and the object ID is appended to the ZSTE location indicator to generate a smart address for the object. The generated smart address is stored in a data store.

22 Claims, 12 Drawing Sheets

| ZSTE LOCATION INDICATOR: | BK15.CJ5.CJ5.AK05.APT18E |
|---|---|
| OBJECT ID | 01 |
| Name: | John Henry |
| Address: | 423 Alma Lane, New York, NY 11022, 18$^{th}$ Floor Apt E |
| Contact | Skypejohn |
| Instruction | Call before delivery |
| Mobility | STATIC |
| Bar Code | Yes |

| ZSTE LOCATION INDICATOR: | BK15.CJ5.CJ5.AK05.APT18E |
|---|---|
| OBJECT ID | 02 |
| Name: | John Henry |
| Address: | 423 Alma Lane, New York, NY 11022, 18$^{th}$ Floor Apt E |
| Contact | Skypejohn |
| Instruction | Send Alarm when set to Away |
| Mobility | STATIC |
| Bar Code | Yes |

| FIELD | FIELD CHARACTERISTICS |
|---|---|
| ZSTE LOCATION INDICATOR: | ZSTE ADDRESS |
| OBJECT ID | UNIQUE IDENTIFIER |
| OWNERSHIP | BELONGS TO |
| PHYSICAL ADDRESS | STREET ADDRESS |
| GROUP ID | MASTER CLASS |
| Mobility | STATIC / MOBILE |
| OBJECT DATA | DATA STRUCTURE, DETAILS |
| OBJECT RIGHTS | CRUD RIGHTS |
| OBJECT ATTRIBUTION | 3$^{rd}$ Party Inputs |
| COMMUNICATION | DATA TRANSMISSION |
| SHARING | INTO OTHER SYSTEMS |
| ALERTS | MONITORING FOR |
| ALARMS | ESCALATION |

FIGURE 4C

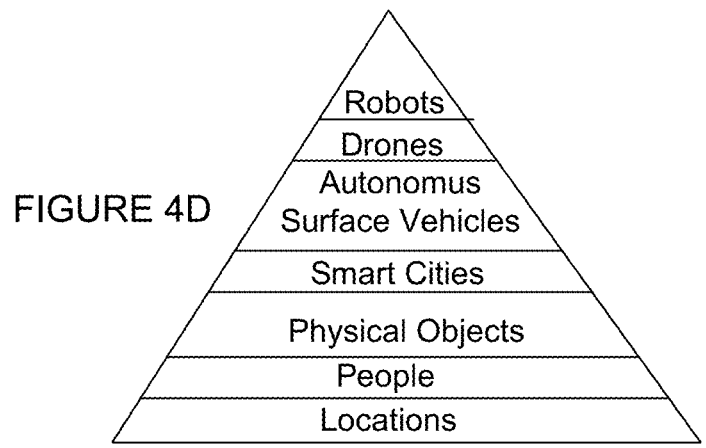

SYSTEM AND METHOD FOR GENERATING AN ADDRESS INDICATOR FOR AN OBJECT BASED ON A LOCATION OF THE OBJECT

RELATED APPLICATIONS

This application is a Continuation-in-part application of and claims priority to U.S. patent application Ser. No. 16/238,511 filed on Jan. 2, 2019, entitled "System and method for generating an address indicator for an object based on a location of the object", which claims priority to U.S. provisional patent application No. 62/613,055 filed on Jan. 3, 2018, entitled "A smart addressing methodology and implementation based on locating any spot on earth with a unique smart address with a variable height definition". U.S. patent application Ser. No. 16/238,511 is incorporated herein by reference, in its entirety. U.S. provisional patent application No. 62,613,055 is incorporated herein by reference, in its entirety.

TECHNICAL FIELD

The present invention relates generally to associating a geo location to an object and, more particularly, generating and associating an address to the object, based on the geo location of the object.

DESCRIPTION OF RELATED ART

In the present day environment, various goods and services are provided based on a location of an object. The object may be a person, a structure, a dwelling, a store, a vehicle, a part, a device, or any item that may be associated with a location, either stationary or movable. In general, location of an object is identified based on an address of the location. However, in some applications, an address of an object may not be sufficient to provide goods and services to the object. In some examples, multiple objects may have same address and it may require manual intervention to determine and distinguish between multiple objects in the same address.

As more and more goods and services are delivered using minimal manual intervention, for example, use of drones and robots to perform these functions, there is a need to come up with an addressing scheme that is conducive for automation. Further, as location based services proliferate, objects that may not have computing smarts built-in may need to be provided those services. It is with these needs in mind, this disclosure arises.

SUMMARY OF THE INVENTION

In one embodiment, a method for associating an address for an object is disclosed. A smart address server is provided with a processor and memory. The smart address server is configured to receive a geo location for the object, the geo location indicative of the latitude and longitude of the location of the object. The geo location of the object is converted into a zone, sector, and target portion to generate a ZST location indicator for the object. An elevation portion is appended to the ZST location, to generate a ZSTE location indicator for the object. An object ID is assigned to the object and the object ID is appended to the ZSTE location indicator to generate a smart address for the object. The generated smart address is stored in a data store.

In yet another embodiment, a system for associating an address for an object is disclosed. A smart address server is provided with a processor and memory. The smart address server is configured to receive a geo location for the object, the geo location indicative of the latitude and longitude of the location of the object. The geo location of the object is converted into a zone, sector, and target portion to generate a ZST location indicator for the object. An elevation portion is appended to the ZST location, to generate a ZSTE location indicator for the object. An object ID is assigned to the object and the object ID is appended to the ZSTE location indicator to generate a smart address for the object. The generated smart address is stored in a data store.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are now described with reference to the drawings. In the drawings, the same components have the same reference numerals. The illustrated embodiments are intended to illustrate but not limit the invention. The drawings include the following Figures:

FIGS. 4A and 4B show example ZSTE location indicator for two different objects, located at the same location, along with various attributes of the objects, according to an example of this disclosure;

FIG. 4C shows an example ZSTE location indicator and associated attributes, according to an example of this disclosure;

FIG. 4D shows various objects that may be associated with a ZSTE location indicator, according to an example of this disclosure;

DETAILED DESCRIPTION

Figure 1:
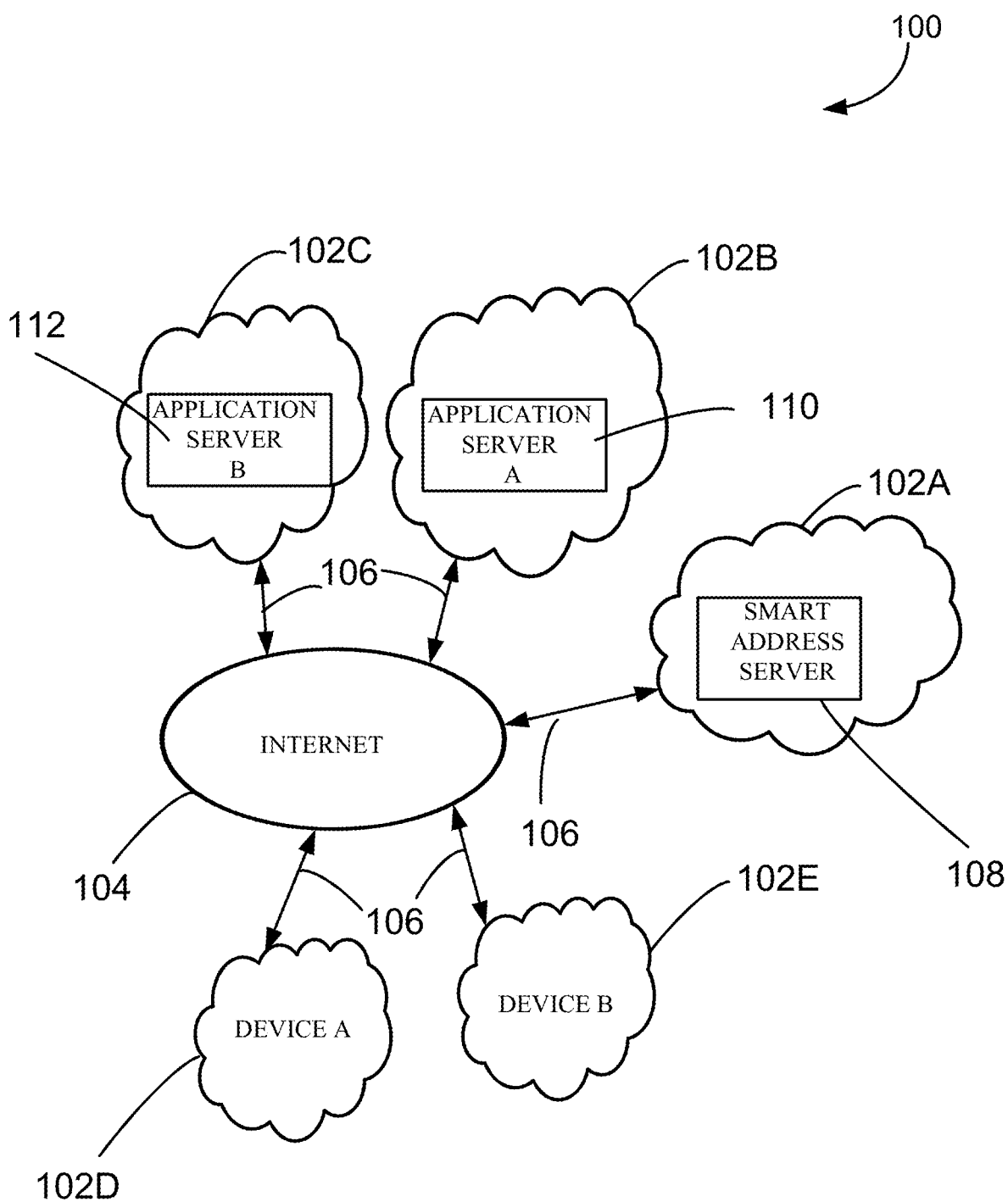
FIG. 1 shows an example computing environment with example smart address server of this disclosure, according an example of this disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a systems and methods for generating an address for an object, based on its location. Referring now to the drawings, where similar reference characters denote corresponding features consistently throughout the figures, various examples of this disclosure is described.

FIG. 1 depicts an example network computing environment 100. The network computing environment 100 may have a plurality of computing resources, for example, computing resources 102A, 102B and 102C, all connected to internet 104, over link 106. In some examples, computing resources 102A, 102B and 102C may be a cloud computing resource, for example, cloud computing resource provided by vendors like Amazon® or Microsoft®. In some examples, the computing resources 102A, 102B and 102C may be a combination of standalone computing resources connected to the internet 106 and cloud computing resources. FIG. 1 also depicts computing resources 102D and 102E, which may be stand alone devices connected to the internet 104 over link 106.

In one example, a smart address server 108 may be executed in computing resource 102A. Additionally, one or more application servers may be executed in computing resource 102B and 102C. As an example, application server A 110 is executed on computing resource 102B and application server B 112 is executed on computing resource 102C. As one skilled in the art appreciates, application servers may be configured to provide one or more services.

In some examples, application servers may be configured as a map server, configured to provide a map associated with a location. In some examples, application servers may be configured as an enterprise resource management server, capable of providing various functions required for enterprise resource planning. As an example, enterprise resource management server may be configured to manage inventory, including ordering, tracking and fulfillment of parts. In some examples, the application server may be configured to provide order fulfillment services, like receiving an order for a part, preparing a ticket to pull the part, providing addressing labels for packaging the part and tracking the shipping and delivery of the part. As one skilled in the art appreciates, these are only some of the examples of functions and features of application servers and application servers may be configured to provide various other services.

Device A and Device B may be any computing device, with one or more applications executed on the computing device, with a communication interface configured to communicate over the link 106. In one example, one or more of the devices may be passive devices that may not have computing resources, however, physically present or associated with a computing environment configured to communicate over the internet. In some examples, the computing environment may be static in the sense, fixed to a location. In some examples, the computing environment may be dynamic, in the sense, movable from one location to another location. Devices referenced in this disclosure may be alternatively referred to as objects.

Figure 2:
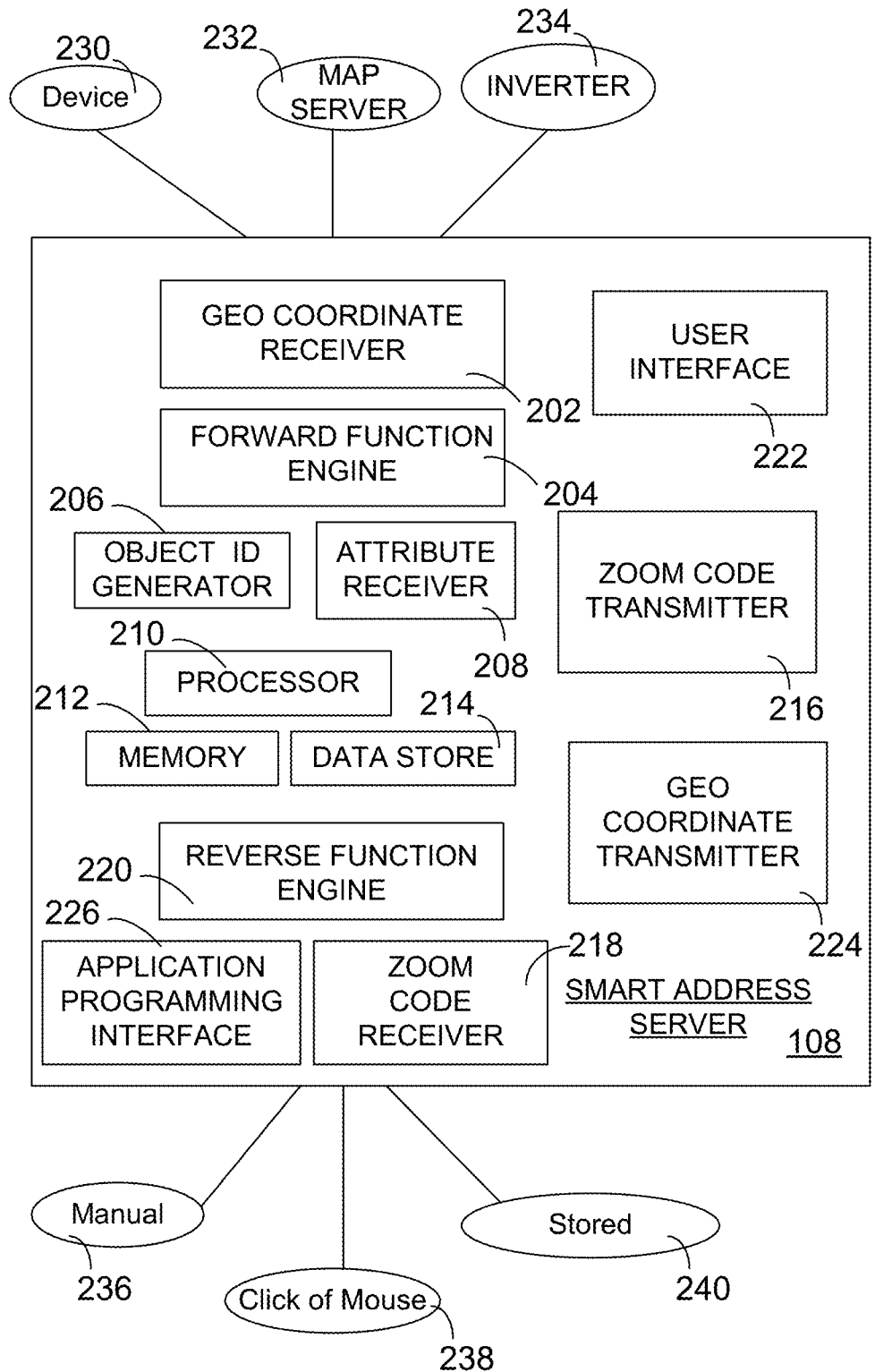
FIG. 2 depicts block diagram of an example smart address server of this disclosure.

Now, referring to FIG. 2, example smart address server 108 of this disclosure will be described. The smart address server 108 includes a geo coordinate receiver 202, a forward function engine 204, object ID generator 206, attribute receiver 208, processor 210, memory 212, data store 214, zoom code transmitter 216, zoom code receiver 218, reverse function engine 220, geo coordinate transmitter 224 and an application programming interface (API) 226. Various function and features of the smart address server 108 will now be described. Detailed operation of the smart address server 108 will be later described with reference to additional examples and figures.

The geo coordinate receiver 202 is configured to receive information related to geo location information for an object or a device. The geo location information for an object may be received from a device 230, a map server 232 or an inverter 234. The device 230 may be any computing device configured to communicate with the smart address server 108 and send information related to the geo location information for the object. A map server 232 may be a server configured to communicate with the smart address server 108, and send information related to the geo location information for the object. An inverter 234 may be a server configured to receive a physical address or location of the object, convert the physical address to information related to geo location information. The inverter 234 may be configured to communicate with the smart address server 108, and send information related to the geo location information for the object.

In some examples, the user interface 222 of the smart address server 108 may be configured to receive geo location information for an object and send the received information to the geo coordinate receiver 202. In some examples, the geo location information may be in the form of a latitude and longitude of the location the object is currently present or located.

The forward function engine 204 is configured to process the received geo location information and convert the geo location information into a zone, sector and target portion to generate a ZST location indicator for the object. Conversion of the received geo location information to a ZST location indicator will be later described in detail.

The object ID generator 206 is configured to generate a unique identification for the object. The unique identification for the object may be numeric, alpha numeric and may include one or more special characters. The unique identification for the object is associated with the generated ZST location.

The attribute receiver 208 is configured to receive one or more attributes for the object. In one example, the attributes are received using the user interface. In one example, the attributes may be electronically received from an external application, through the application programming interface 226. In one example, one of the attribute received is an elevation information for the object at the location where the object is located. In one example, the elevation information is appended as an elevation portion to the ZST location indicator to generate a ZSTE location indicator.

The processor 210 is configured to perform various arithmetic and logical functions of the smart address server 108. The memory 212 is used to stored and retrieve various programs, sub-routines, including transient and permanent information used or created by the processor 210. The data store 214 is used to store and retrieve various information generated or used by the smart address server 108. For example, the generated ZSTE location indicator along with various attributes of the object may be stored in the data store 214. In one example, the corresponding geo location indicator may also be associated with the ZSTE location indicator and stored in the data store 214.

The zoom code transmitter 216 is configured to transmit the ZSTE location indicator to an external device. In one example, the zoom code transmitter 216 may selectively retrieve the ZSTE location indicator stored in the data store 214 and transmit to an external device. As one skilled in the art appreciates, the smart address server 108 may include additional functional blocks capable of communicating with external devices, for example, using one or more communication protocols. The zoom code transmitter 216 may include those functional capabilities or use one or more of other functional blocks to perform these functions.

Zoom code receiver 218 is configured to receive a zoom code, for example, the ZSTE location indicator from an external device. In some example, the ZSTE location indicator may be received manually from an external device 236. In some examples, the ZSTE location indicator may be received from an application, based on a click of a mouse 238 or selection of a link displayed on a display device. In some example, the ZSTE location indicator may be received from a stored location, for example a data store 240 that is accessed by an application and transmitted to the smart address server 108.

The received ZSTE location indicator is then processed by the reverse function engine 220 to decode the ZSTE location indicator into a geo coordinate indicator, for example, latitude and longitude geo location indicator. In one example, the reverse function engine 220 may access the data store 214 and retrieve the geo coordinate indicator corresponding to the received ZSTE location indicator. In one example, the ZSTE location indicator may be decoded to generate the geo coordinate indicator by the reverse function engine 220. In this example, the reverse function engine is configured to perform operations performed by the forward function engine 204 to generate the ZST location indicator, in reverse order, to generate the geo coordinate indicator. The decoded geo coordinate indicator is then transmitted by the geo coordinate transmitter 224 to an external device. The geo coordinate indicator received by the external device may be used by one or more applications running on the device to provide additional services.

Figure 3:
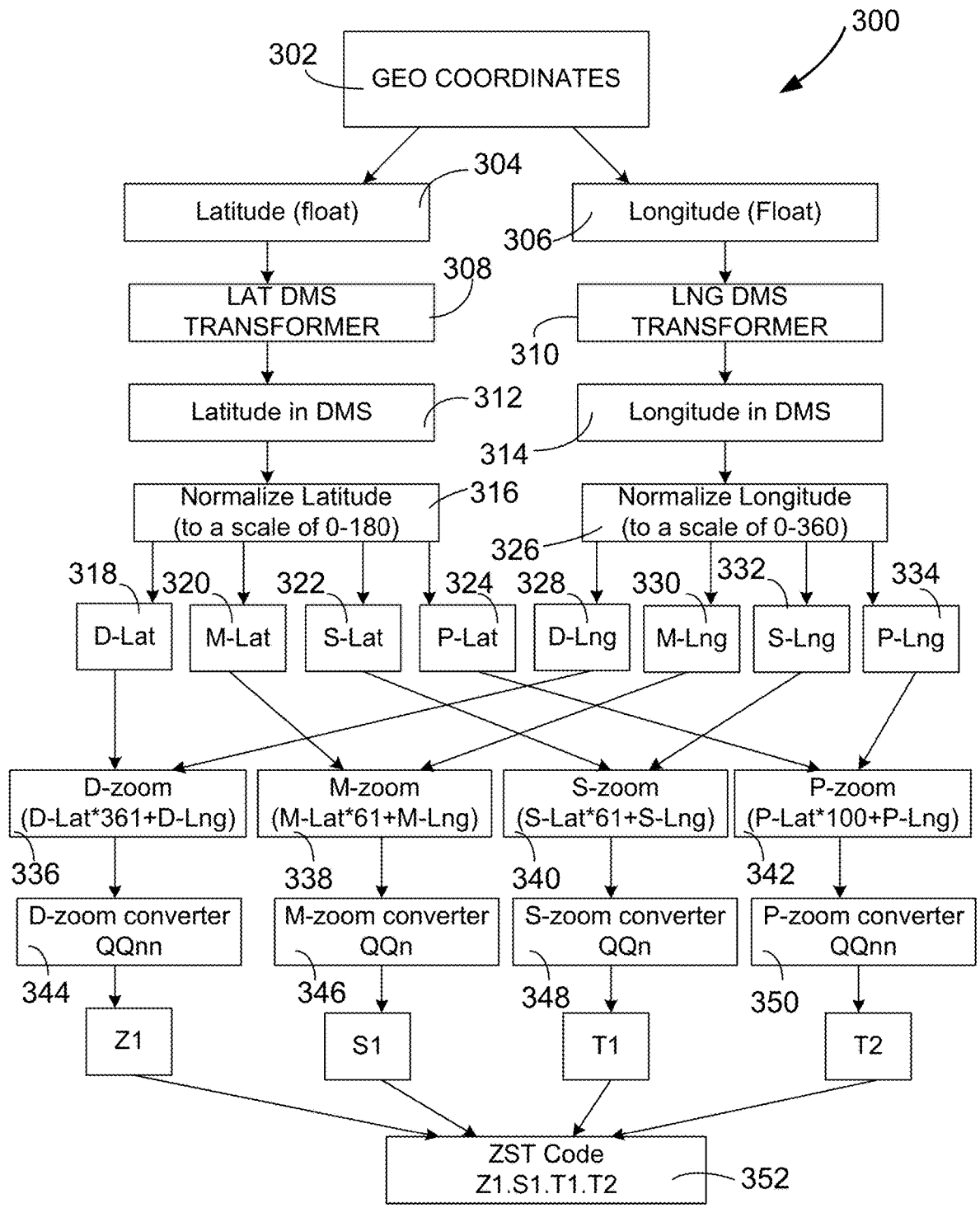
FIG. 3 shows block diagram of conversion of a geo location coordinates into a ZST location indicator, according to an example of this disclosure.

Having described an example smart address server 108 of this disclosure, now referring to FIG. 3, an example diagram 300 shows various operations to create a ZST location indicator, based on a geo location coordinates. Now, referring to FIG. 3, in block 302, the geo coordinates are received. For example, the geo coordinate receiver 202 of the smart address server 108 receives the geo location coordinates. The received geo coordinates include a latitude portion 304 and a longitude portion 306. The received latitude and longitude may be in the form of a float number. The lat dms transformer 308 converts the latitude (in float) to generate latitude represented as degrees, minutes and seconds (DMS) in block 312. The lng dms transformer 310 converts the longitude (in float) to generate longitude represented as degrees, minutes and seconds (DMS) in block 314.

Next, in block 316, the latitude in DMS is normalized to a scale of 0-180, to generate D-Lat 318, M-Lat 320, S-Lat 322 and P-Lat 324. Similarly, in block 326, the longitude in DMS is normalized to a scale of 0-360, to generate D-Lng 328, M-Lng 330, S-Lng 332 and P-Lng 334. As one skilled in the art appreciates, latitude is represented on a scale of −90 to +90 degrees. In this example, the latitude is normalized to a scale of 0-180, by adding 90 degrees to the latitude value. Similarly, the longitude is represented on a scale of −180 degrees to +180 degrees. In this example, the longitude is normalized to a scale of 0-360, by adding 180 degrees to the longitude value.

Next, in block 336, the D-Lat 318 and D-Lng 328 are combined to form a D-zoom. D-zoom is given by the formula D-zoom=(D-Lat*361+D-Lng). In this way, D-zoom is encoded with integer values of latitude and longitude. By encoding the D-zoom in this way, a reverse operation to recover latitude and longitude (degree) from D-zoom may be performed in an inverse operation. In an inverse operation, the value of D-zoom is divided by 361 and the quotient of that operation yields the latitude value. The remainder of that operation is then multiplied by 361 to get longitude value.

Similarly, in block 338, M-Lat 320 and M-Lng 330 are combined to form a M-zoom. In one example, the M-zoom is given by the formula M-zoom=(M-lat*61+M-Lng). In block 340, S-Lat 322 and S-Lng 332 are combined to form a S-zoom. In one example, the S-zoom is given by the formula S-zoom=(S-lat*61+S-Lng). Next, in block 342, P-Lat 324 and P-Lng 334 are combined to form a P-zoom. In one example, the P-zoom is given by the formula P-zoom=(P-lat*100+P-Lng).

As one skilled in the art appreciates, a reverse operation to recover latitude and longitude (minutes, seconds and precision) may be performed similar to as previously described with reference to D-zoom. by using a value by 61 instead of 361 for M-zoom and S-zoom and using a value of 100 instead of 361 for P-zoom. Further, generation of D-zoom, M-zoom, S-zoom and P-zoom as described above condenses two coordinates (latitude and longitude) into one coordinate form, without losing information so that we can run a reverse transformation to extract latitude and longitude from the ZST location indicator. Also, in this example, the precision portion P-zoom is considered to be two digits after decimal point (a 0-99 value, giving a multiplier of 100). However, other precision levels may be considered, for example, single digit after decimal point (multiplier of 10), three digits after decimal point (multiplier of 1000) etc.

In one example, the D-zoom represents the zone portion of the ZST location indicator. In one example, the M-zoom represents the sector portion of the ZST location indicator. In one example, S-zoom represents the target portion of the ZST location. In some examples, P-zoom may also form part of the target portion of the ZST location, giving a further granularity to the location of an object.

As one skilled in the art appreciates, the D-zoom, M-zoom, S-zoom and P-zoom are represented as integers using the operation described above. Representing the D-zoom, M-zoom, S-zoom and P-zoom in integers will require four 6 digit representations (24 digit value). Such a long representation of the location indicator may be cumbersome to remember and may require fields that may be too long to be represented on a display device or stored in a data store. In some examples, it may be advantageous to represent the D-zoom, M-zoom, S-zoom and P-zoom in an alpha-numeric format.

More specifically, in one example, the D-zoom is represented in a QQnn format, where "Q" represents an alpha character from an array of 26 characters, for example, characters A to Z and "n" represents a numeric character from an array of numbers {0,1, 2, 3, 4, 5, 6, 7, 8, 9}. Thus, QQnn has the ability to represent 26×26×10×10=67600 integer numbers, which exceeds the requirement to cover the product of all the normalized laititude and longitude numbers, which are equal to 64,900 integers, being the product of 360 degrees of longitude×180 degrees of latitude.

Similarly, M-zoom is represented in QQn format, S-zoom is represented in QQn format and P-zoom is represented in QQnn format. In its alphanumeric form, QQn for M-zoom and S-zoom can represent 6,700 values. M-zoom requires covering 60 minutes of latitude×60 minutes of longitude, which represents 3600 integer values. Similarly, S-zoom requires covering 60 seconds of latitude and 60 seconds of longitude, which represents 3600 integer values. Further, P-zoom represented as QQnn can represent 67,600 values, which is more than 100×100=10,000 values required to represent a two digit precision value. As one skilled in the art appreciates, such a representation of D-zoom, M-zoom, S-zoom and P-zoom provides for a fourteen digit representation of the ZST location indicator.

The D-zoom converter 344 converts the D-zoom into a QQnn format (as described above) to generate a zone portion Z1 of the ZST location indicator. The M-zoom converter 346 converts the M-zoom into a QQn format, to generate a sector portion S1 of the ZST location indicator. The S-zoom converter 348 converts the S-zoom into a QQn format, to generate a target portion T1 of the ZST location indicator. The P-zoom converter 350 converts the P-zoom into a QQnn format, to generate another target portion T2 of the ZST location indicator. The Z1, S1, T1 and T2 portion are combined to form the ZST location indicator 352. In one example, the ZST location indicator 352 is represented as Z1.S1.T1.T2.

The P-zoom alphanumeric encoding allows for precision decimal values of latitude and longitude beyond degrees, minutes, and seconds. The example described above allows for an integer representation of 67,600 positions for P-zoom, leading to at least two decimal positions for latitude and longitude. Thus we can represent a latitude/longitude of for example, Lat:45 deg, 32 min, 56.53 seconds and Lng: −55 deg, 47 min, 35.41 seconds.

Figure 3A:
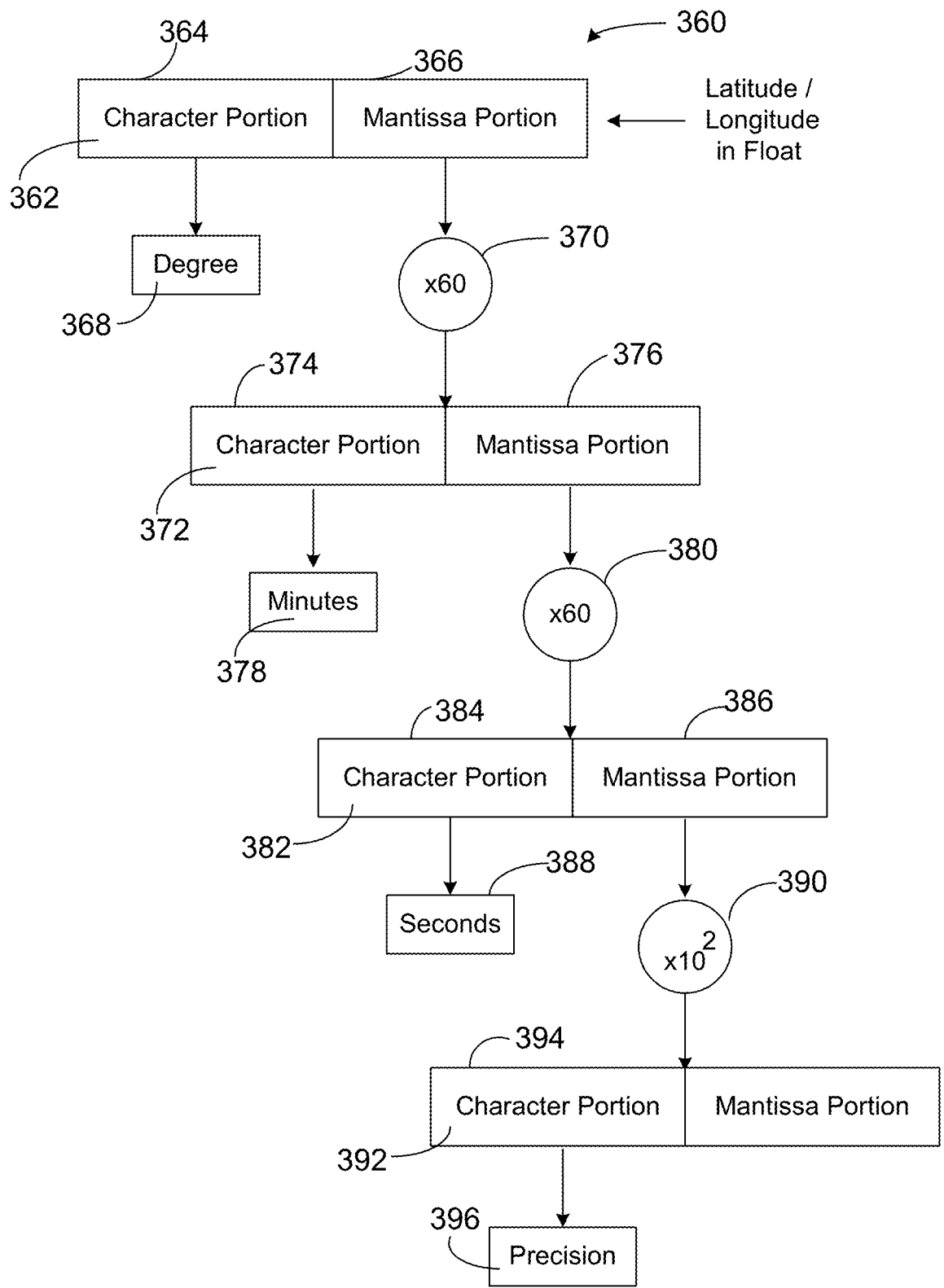
FIG. 3A shows an example block diagram to convert latitude and longitude in float format to a degrees, minutes and seconds format.

Having described generation of the ZST location indicator 352, referring to FIG. 3A, an example DMS transformer 360 is described. The DMS transformer 360 may be configured to be a Lat DMS transformer 304 or a Lng DMS transformer 306 as described with reference to FIG. 3. The latitude or longitude is represented as a float 362. The float 362 has a characteristic portion 364 and a mantissa portion 366. The characteristic portion of the float 362 is designated as the degree 368 of the latitude or longitude as the case may be. The mantissa portion 366 is multiplied by 60 by first multiplier 370 and generates a second float 372, with a characteristic portion 374 and mantissa portion 376. The characteristic portion 374 of the second float 372 is designated as the minutes 378 of the latitude or longitude as the case may be. The mantissa portion 376 of the second float 372 is multiplied by 60 by the second multiplier 380 and generates a third float 382, with a characteristic portion 384 and a mantissa portion 386. The characteristic portion 384 of the second float is designated as seconds 388 of the latitude or longitude as the case may be. The mantissa portion 386 of the third float 382 is multiplied by 10 to the power of 2 (100) by the third multiplier 390 and generates a fourth float 392, with a characteristic portion 394 and a mantissa portion 396. The characteristic portion 394 of the third float 392 is designated as precision 396 of the latitude or longitude as the case may be.

As one skilled in the art appreciates, in this example, three multipliers, first multiplier 370, second multiplier 380 and third multiplier 390 are described, a single multiplier may be configured to selectively perform various multiplications described above. Further, the degree 368 for latitude is normalized on a scale of 0 to 180. Similarly, the degree 368 for longitude is normalized on a scale of 0-360.

Figure 4:
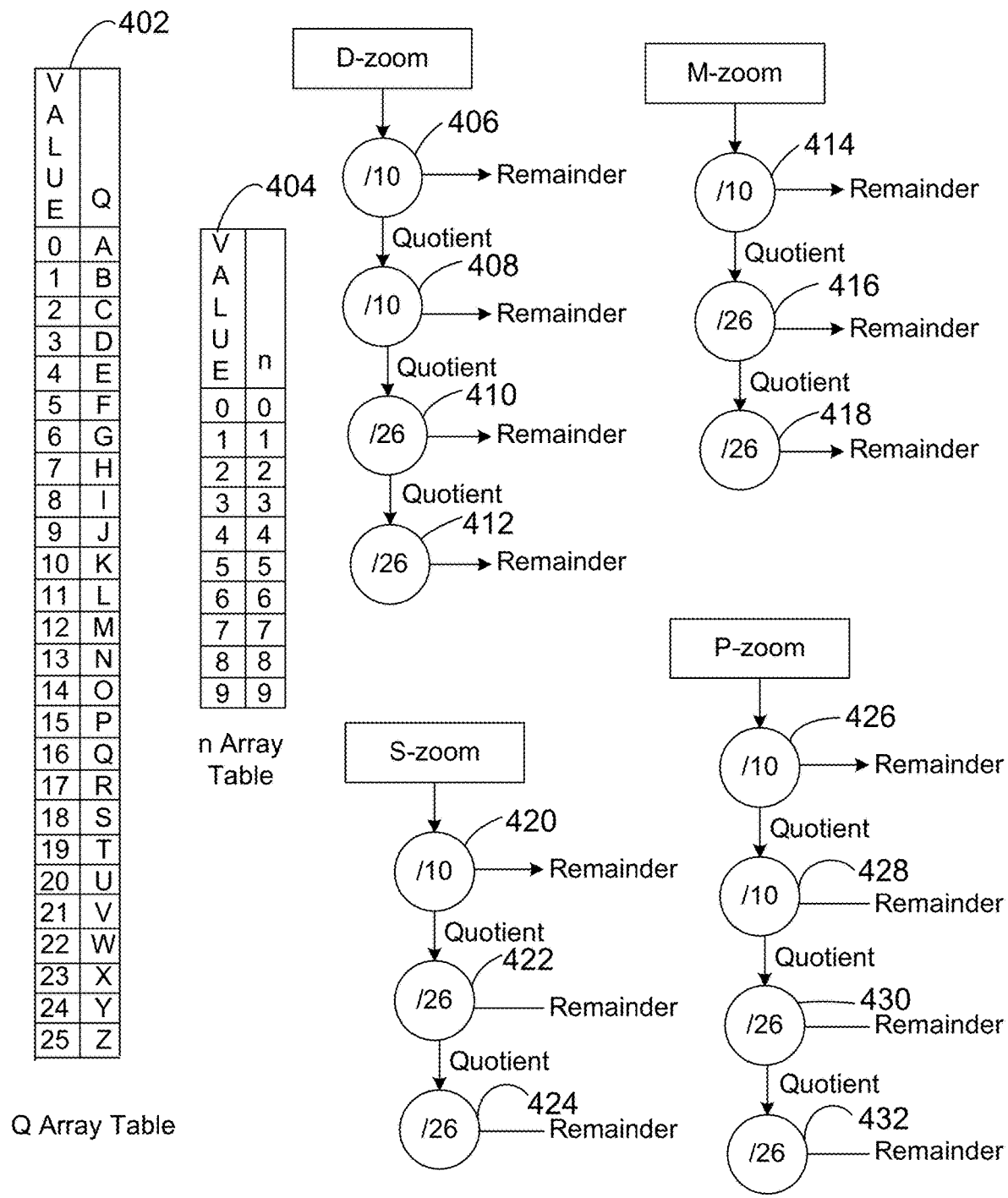
FIG. 4 shows an example conversion of D-zoom, M-zoom, S-zoom and P-zoom values into a ZST location indicator, according to an example of this disclosure.

Now, referring to FIG. 4, an example operation of a D-zoom converter, M-zoom converter, S-zoom converter and P-zoom converter will be described. FIG. 4 shows Q array table 402 and an n array table 404. In this example, the latitude in degrees (D-Lat) is 10 and longitude in degrees (D-Lng) is 5. The corresponding D-zoom code will be (D-lat*361+D-Lng), which is equal to 10*361+5=3615. The D-zoom code is converted to QQnn format, by continuously reducing D-zoom by 10 twice and by 26 twice and collecting the resulting character from the Q array table 402 and n array table 404.

In this example, the D-zoom code value of 3615 is divided by 10 by first divider 406, giving a quotient of 361 and remainder value of 5. Looking up the remainder value of 5 in the n array table 404, we get a "n" value of 5. Next, the quotient of 361 is divided by 10 by second divider 408 gives a quotient of 36 and a remainder of 1. Looking up the remainder value of 1 in then array table 404, we get next "n" value of 1. Next, the quotient of 36 is divided by 26 by the third divider 410 gives a quotient of 1 and a remainder of 10. Looking up the remainder value of 10 in the Q array table 402, we get the "Q" value of K. next, the quotient of 1 is divided by 26 by the fourth divider 412 gives a quotient of 0 and a remainder of 1. Looking up the remainder value of 1 in the Q array table 402, we get the next "Q" value of B. Now, assembling the Q values and n values, we get a code of BK15 for a D-zoom code value of 3615.

In this example, the latitude in minutes (M-Lat) is 10 and longitude in minutes (M-Lng) is 5. The corresponding M-zoom code will be (M-lat*61+M-Lng), which is equal to 10*61+5=615. The M-zoom code is converted to QQn format, by continuously reducing M-zoom by 10 once and by 26 twice and collecting the resulting character from the Q array table 402 and n array table 404.

In this example, the M-zoom code value of 615 is divided by 10 by fifth divider 414, giving a quotient of 61 and remainder value of 5. Looking up the remainder value of 5 in the n array table 404, we get a "n" value of 5. Next, the quotient of 61 is divided by 26 by sixth divider 416 which gives a quotient of 36 and a remainder of 9. Looking up the remainder value of 9 in the Q array table 402, we get "Q" value of J. Next, the quotient of 2 is divided by 26 by the seventh divider 418 gives a quotient of 0 and a remainder of 2. Looking up the remainder value of 2 in the Q array table 402, we get the next "Q" value of C. Now, assembling the Q values and n values, we get a code of CJ5 for a M-zoom code value of 615.

In this example, the latitude in seconds (S-Lat) is 10 and longitude in seconds (S-Lng) is 5. The corresponding S-zoom code will be (S-lat*61+S-Lng), which is equal to 10*61+5=615. The S-zoom code is converted to QQn format, by continuously reducing M-zoom by 10 once and by 26 twice and collecting the resulting character from the Q array table 402 and n array table 404.

In this example, the S-zoom code value of 615 is divided by 10 by eighth divider 420, giving a quotient of 61 and remainder value of 5. Looking up the remainder value of 5 in the n array table 404, we get a "n" value of 5. Next, the quotient of 61 is divided by 26 by ninth divider 422 which gives a quotient of 36 and a remainder of 9. Looking up the remainder value of 9 in the Q array table 402, we get "Q" value of J. Next, the quotient of 2 is divided by 26 by the tenth divider 424 which gives a quotient of 0 and a remainder of 2. Looking up the remainder value of 2 in the Q array table 402, we get the next "Q" value of C. Now, assembling the Q values and n values, we get a code of CJ5 for a S-zoom code value of 615.

In this example, the latitude precision (P-Lat) is 10 and longitude precision (P-Lng) is 5. The corresponding P-zoom code will be (P-lat*100+P-Lng), which is equal to 10*100+ 5=1005. The P-zoom code is converted to QQnn format, by continuously reducing P-zoom by 10 twice and by 26 twice and collecting the resulting character from the Q array table 402 and n array table 404.

In this example, the P-zoom code value of 1005 is divided by 10 by eleventh divider 426, giving a quotient of 100 and remainder value of 5. Looking up the remainder value of 5 in the n array table 404, we get a "n" value of 5. Next, the quotient of 100 is divided by 10 by twelfth divider 428 gives a quotient of 10 and a remainder of 0. Looking up the remainder value of 0 in the n array table 404, we get next "n" value of 0. Next, the quotient of 10 is divided by 26 by the thirteenth divider 430 gives a quotient of 0 and a remainder of 10. Looking up the remainder value of 10 in the Q array table 402, we get the "Q" value of K. Next, the quotient of 0 is divided by 26 by the fourth divider 412 gives a quotient of 0 and a remainder of 0. Looking up the remainder value of 0 in the Q array table 402, we get the next "Q" value of A. Now, assembling the Q values and n values, we get a code of AK05 for a P-zoom code value of 1005.

In some examples, the P-zoom code value may be less than four digits, for example, if the precision of the geo location indicator has a single digit or no digits for the precision. In such a case, one or more zeros are added to the MSB (most significant bit) of the P-zoom code value, to generate a four digit P-zoom code value. For example, if the P-zoom code value was 105, then one zero is added to create the P-zoom value of 0105 and then, corresponding QQnn values are derived for the P-zoom code value.

In summary, the ZST location indicator in this example will be BK15.CJ5.CJ5.AK05. As previously described, in some examples, an elevation portion may be appended to the ZST location indicator to form a ZSTE location indicator. For example, if the ZST location indicator indicated a multi-story apartment and the object location was apartment 18E, then, the ZSTE location indicator may be constructed by appending the apartment location. For example, the ZSTE location indicator may be of the form BK15.CJ5.CJ5.AK05.APT18E. FIG. 4A shows an example ZSTE location indicator for the object apartment 18E, along with additional attributes associated with the object.

As one skilled in the art appreciates, the elevation portion of the ZSTE location indicator may be determined and added to the ZST location indicator in various different ways. In some examples, the elevation indicator may be received from a user from a user interface. In some examples, the elevation indicator may be selectively extracted from a record, for example, address field of a record stored in a data store. In some examples, the elevation indicator may be received from a device, for example, a phone, a drone or an aircraft capable of providing altitude information. In some examples, the elevation information may be received from a GIS systems, for example, terrain maps. In some examples, the elevation indicator may be derived based on a datum (or reference elevation, say ground floor) and adding increments to elevation from the datum (for example, adding number of floors from the datum or adding increments to elevation, based on height of each floor). In some examples, elevation indicator may be derived from mean sea level and diving depths from mean sea level, for example, from a submarine or a sub sea vehicle.

Now, referring to FIG. 4A, we notice that the ZSTE location indicator 440 for address 442 is shown as BK15.CJ5.CJ5.AK05.APT18E. Further, an object ID 444 of "01" is assigned to this ZSTE location indicator. Name associated with this ZSTE location indicator is "John Henry". Contact information is to use "skypejohn". Instruction for delivery of packages is to "call before delivery". The mobility 446 field of this object is set to "static", in other words, the associated ZSTE location indicator is fixed and does not change. If on the other hand, if the mobility 446 field of this object was set to "mobile", then the ZSTE location indicator for the object would change, based on a changed location of the object. For example, instead of John's apartment, if the object was John's car, the mobility field may be set to "mobile". Then, the ZSTE location indicator of the object car would change when the car moves from one location to another.

Now, referring to FIG. 4B, another ZSTE location indicator along with associated attributes are shown. In this example, the ZSTE location indicator 440 is same as the ZSTE location indicator shown in FIG. 4A. However, the object ID for this location indicator is set to "02". In this example, the object is a security camera, which can send an alarm when motion is detected. The owner is still John Henry and address is still the same as shown in FIG. 4A. However, in Instruction 448 field, it is set to "Send Alarm when set to Away". In other words, if the security camera is set to monitor motion within the apartment, then an alarm is sent to John, when motion is detected.

As one skilled in the art appreciates, by selectively changing the object ID, same ZSTE location indicator is used to identify and track different objects. These different objects may have different attributes associated with them. In one example, the ZSTE location identifier is associated with the object ID to generate a smart address for the object. In some examples, the object ID may be appended to the ZSTE location indicator to generate the smart address for the object. For example, smart address for the apartment may take the form of BK15.CJ5.CJ5.AK05.APT18E.01. Similarly, the smart address for the security camera may take the form of BK15.CJ5.CJ5.AK05.APT18E.02. And, various attributes of the apartment object and security camera object may be stored in a data store in the smart address server 108.

Now, referring to FIG. 4C, yet another ZSTE location indicator along with associated attributes are shown. In this example, column 450 shows various fields and column 452 shows field characteristics. Some of the fields not previously described with reference to FIGS. 4A and 4B will be described with reference to FIG. 4C. For example, referring to row 454, a group ID field is defined. In one example, the group ID field may indicate a master class various objects may belong to. In some examples, the group ID may refer to a collection of various objects, with each having their own smart address, but having a common group ID. Referring to row 456, an alerts field is defined. The alert field may indicate one or more threshold values that are monitored for, for example, using a sensor or other detecting mechanisms. Referring to row 458, an alarms field is defined. The alarm field may indicate escalation to a third party, for example, generation of an alarm or a notification, when a threshold value set in the alerts field is exceeded.

In some examples, the sensor or other detecting mechanism may not be part of the object being monitored, but may be part of another object that is in the same environment as the object being monitored. In such a situation, the object being monitored and another object that has the sensor or other detecting mechanism may be grouped or associated with each other. In this way, an object that may not have "smarts" can be monitored and controlled, based on a signal received from another object that has the capability to monitor. In some examples, the "Group ID" attribute previously described may be advantageously used to provide "smart" capability to a "dumb" object, by selectively using a "Group ID" for multiple objects to be monitored.

In yet another examples, a collection of plurality of objects may be provided a "Group ID". In one example, all the objects in the collection are considered to be "mobile" and so have a changing ZSTE location identifier based on their location. The collection may be a pallet with multiple objects. In one example, the pallet may be part of another "Group ID", where one or more objects in that group may have the capability to transmit its location. In one example, the location of the pallet is periodically tracked and its corresponding ZSTE location indicator is changed based on the location. Once the pallet ZSTE location identifier is changed, the ZSTE location of all the other objects in the pallet can be advantageously changed.

Referring to FIG. 4E, various things that may be considered as objects to be assigned a ZSTE location indicators is shown. For example, an object may be a location, people, physical objects, autonomous surface vehicles, drones, and robots or any other thing or item that may be represented with a ZSTE location indicator.

Figure 5A:
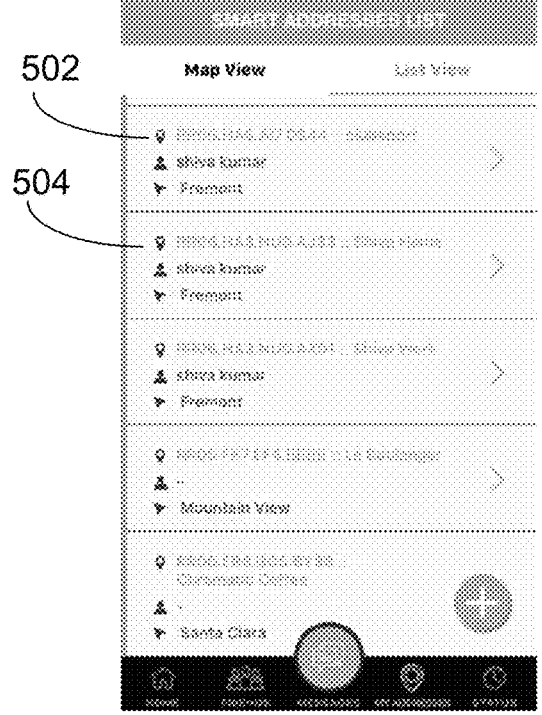
FIGS. 5A and 5B show an example display of ZSTE location indicator on a display device, according to an example of this disclosure.
Figure 5B:
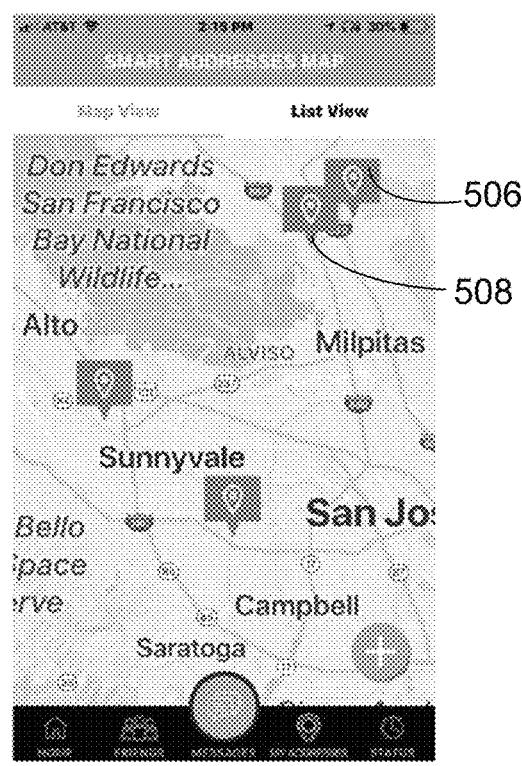

Now, referring to FIGS. 5A and 5B, an example display of ZSTE location indicator on a display device of a computing device is shown. In FIG. 5A, various ZSTE location indicators and associated attributes are shown as a list, under "List View" folder. In FIG. 5B, various ZSTE location indicators are shown as an indicia on a map, under "Map View" folder. Now, referring to FIG. 5A, under the list view, the ZSTE location 502 for "clubsport" is shown. Similarly, ZSTE location 504 for Shiva Home is also shown. In this example, the elevation portion is not shown, as these locations are considered to be at ground level. In one example, when the "Map view" folder is selected, each of the ZSTE location indicators in the list view is sent to the smart address server, to receive corresponding geo locations for each of the locations. For example, the corresponding geo location may include the latitude and longitude of each or the objects. In some examples, the corresponding geo locations may be sent to a map server. The map server maps each of the geo locations on a map as an indicia and sends the map along with the indicia to the device, so that the map along with the indicia can be displayed on the display device. For example, the map along with the indicia of the location is shown on the display device in Map View. For example, the "clubsport" is shown by indicia 506 and "Shiva Home" is shown by indicia 508 in FIG. 5B.

Figure 5C:
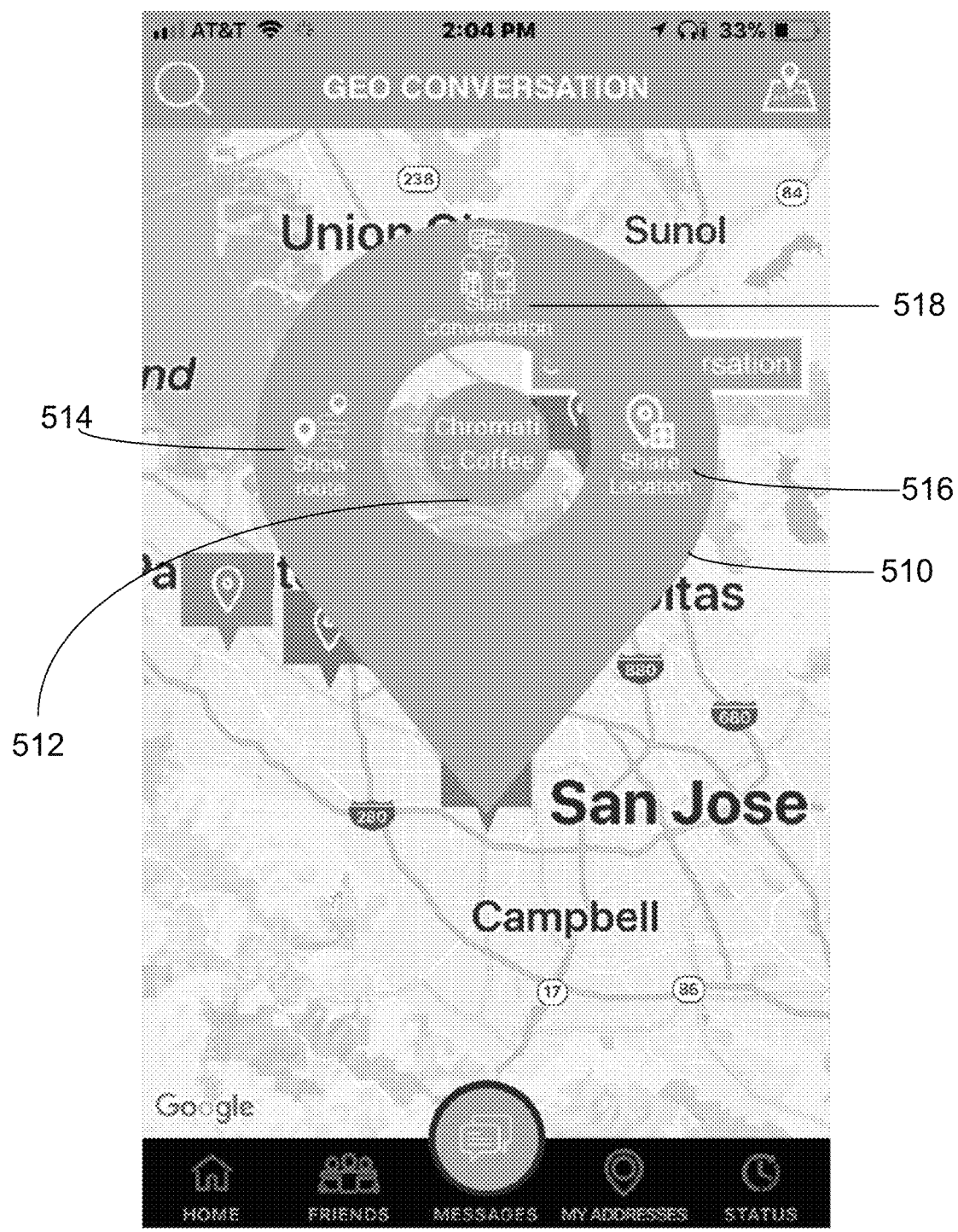
FIG. 5C shows an example display device with various ZSE location indicators along with a menu option, according to an example of this disclosure.

Now, referring to FIG. 5C, an example display device with various ZSTE locations is shown. In one example, when one of the ZSTE location indicator indicia is clicked or selected, a menu option 510 is displayed. The menu option 510 displays the name of the location 512 and provides various options for selection. For example, show route 514, share location 514 and conversation 516 options are presented. By selectively enabling one of these menu options, additional activities associated with each of the option is performed. For example, show route 514 option may display recommended route to the location, from the device location. Share location 516 option may permit the device user to share the selected location with another user. Conversation 518 option may open a communication link with another user and permit communication between the device user and another selected user.

Figure 5D:
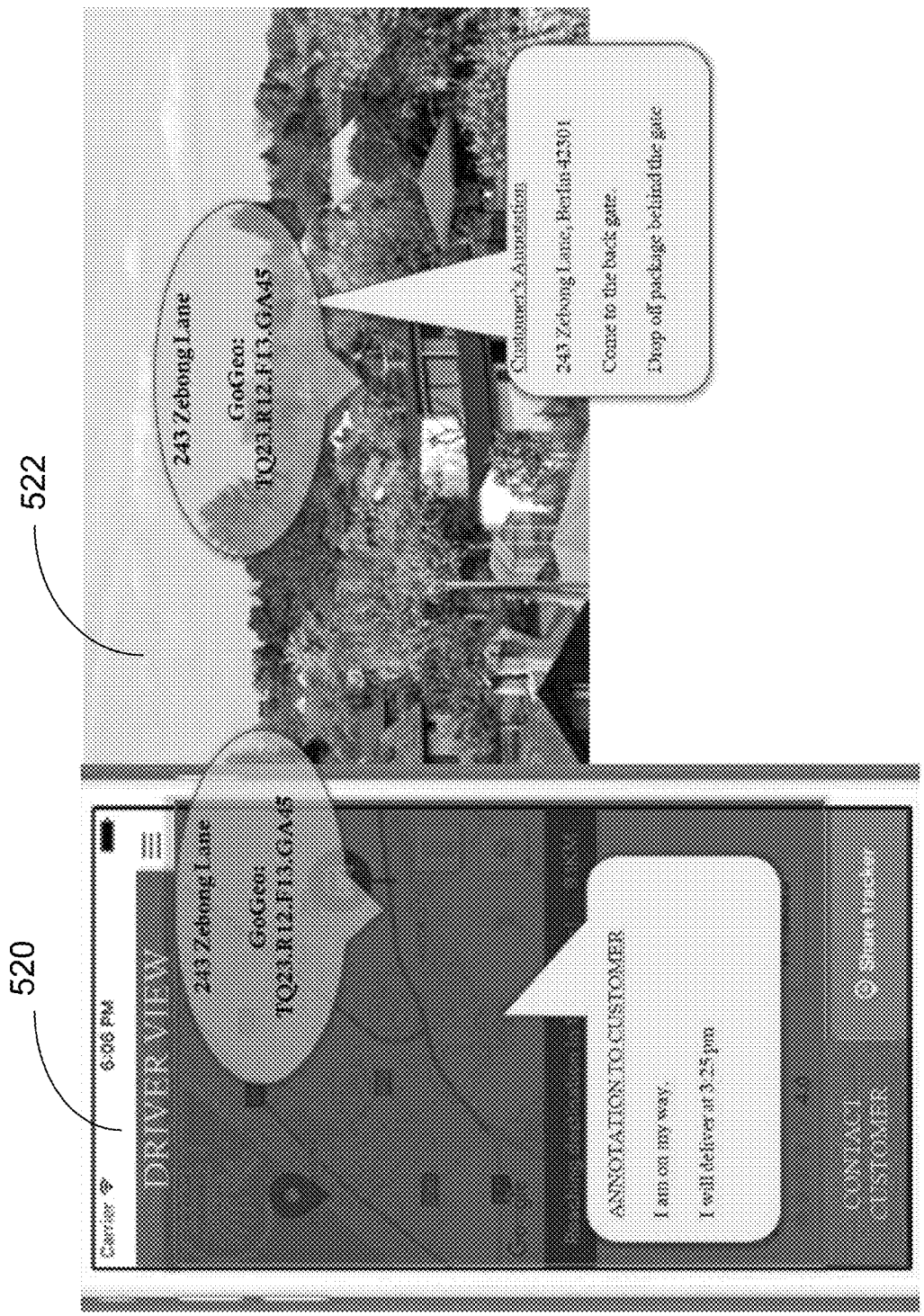
FIG. 5D shows an example conversation between two display devices using ZSTE location indicator, according to an example of this disclosure.

Now, referring to FIG. 5D, an example conversation that may be initiated between a delivery person who is delivering a package to a receiver is shown. The delivery person device 520 shows various conversation initiated by the delivery person to the receiver, using the menu option 510 described with reference to FIG. 5C. In one example, the delivery person initiates the conversation with the receiver, based on the ZSTE location indicator and associated attributes of the receiver. The receiver device 522 shows various conversation initiated by the receiver to the delivery person. As one skilled in the art appreciates, various attributes of the smart address may be advantageously used to communicate and collaborate with multiple objects and people.

Geo messaging: In one example, a location on a map may be selected as an object and corresponding ZSTE location indicator for the selective location is created. A smart address for the location is created by associating an object ID for the object. Then, one or more actions may be taken for the selective location. In one example, a message is sent to a plurality of recipients with the ZSTE location indicator for the selective location, along with one or more messages. In one example, the message is indicative of an event. The messages may include one or more of an invite to meet at the location, with corresponding date and time, a calendar invitation, with details of the meeting, a notification of distress, such as an accident at the selective location, identification of the selective location as a storage spot, identification of the selective location as a parking spot for a vehicle etc. This service may be implemented as a stand-alone service or embedded as a service in other application.

Figure 6:
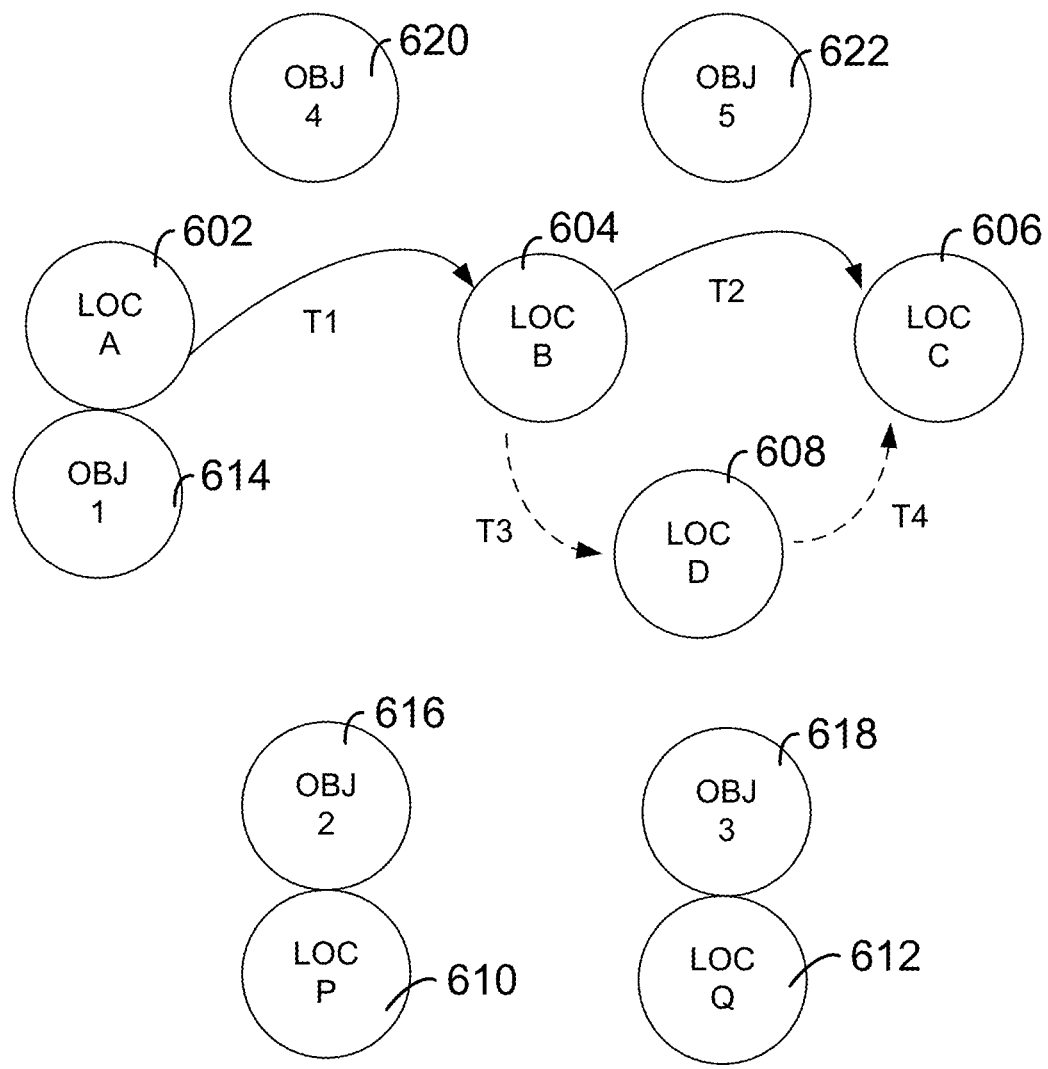
FIG. 6 shows an example diagram with multiple locations and multiple objects with their corresponding ZSTE locations, according to an example of this disclosure.

Now, referring to FIG. 6, various example scenarios with multiple locations and multiple objects are described. In this example, various locations, Loc A 602, Loc B 604, Loc C 606, Loc D 608, Loc P 610 and Loc Q 612, each having a corresponding ZSTE location indicators is shown. Further, various objects, for example, Obj 1 614, Obj 2 616, Obj 3 618, Obj 4 620 and Obj 5 622 are shown, with each having a corresponding ZSTE location indicators.

In one example, the Obj 1 614 is considered a mobile object and its ZSTE location will change, as the Obj 1 614 moves from one location to another location. Initially, the ZSTE location of Obj 1 614 will be same as the ZSTE location of Loc A 602. The Obj 1 614 is scheduled to move from Loc A 602 to Loc B 604 and then to Loc C 606. Estimated time taken by Obj 1 614 to move from Loc A 602 to Loc B 604 is T1. Estimated time taken by Obj 1 614 to move from Loc B 604 to Loc C 606 is T2. When the Obj 1 614 moves from Loc A 602 to Loc B 604, it acquires a new ZSTE location that corresponds to the ZSTE location of Loc B 604. Further, in one example, time taken by the Obj 1 614 to move from Loc A 602 to Loc B 604 is compared to see if it is within a threshold value from the estimated time T1. In one example, the threshold value may be + or −10% of time T1. If it is within the threshold value from the estimated time T1, no alarm is raised. If it is outside the threshold value from the estimated time T1, an alarm is raised. Next, the Obj 1 614 moves from Loc B 604 to Loc C 606, with an estimated time taken to be T2. When the object reaches Oc B 606, time taken by the Obj 1 614 to move from Loc B 604 to Loc C 606 is compared to see if it is within a threshold value from the estimated time T2. In one example, the threshold value may be + or −10% of time T1. If it is within the threshold value from the estimated time T2, no alarm is raised. If it is outside the threshold value from the estimated time T1, an alarm is raised. As one skilled in the art appreciates, the alarm so raised may be selectively used to take one or more corrective actions.

In one example, the Obj 1 614 moves away from the defined path between Loc B 604 and Loc C 606 and instead goes to Loc D 608 and then goes to Loc C 606. In one example, time taken by the Obj 1 614 to go from Loc B 604 to Loc D 608 is T3. Further, time taken by the Obj 1 614 to go from Loc D 608 to Loc C 606 is T4. In one example, T3+T4 may be greater than T2, by a value greater than the allowed threshold value, as previously described. If the Obj 1 614 is capable of indicating its location, mere deviation from the defined location for Loc B 604 and Loc C 606 may indicate a deviation from normal behavior and an alarm may be raised. Additionally, even if Obj 1 614 is not capable of indicating its location, based on the value of T3+T4 being greater than the allowed threshold value may indicate a deviation from normal behavior and an alarm may be raised. As one skilled in the art appreciates, the alarm so raised may be selectively used to take one or more corrective actions.

Referring back to FIG. 6, another example scenario will be described. In this example, Obj 2 616 is located at Loc P 610 and Obj 3 618 is located at Loc Q 612. Further, Obj 4 620 and Obj 5 622 are shown. In this example, Obj 2 616, Obj 3 618, Obj 4 620 and Obj 5 622 are all mobile objects, with their corresponding ZSTE location subject to change, based on their movement. Initially, Obj 4 620 is scheduled to move to Loc A 602 and Obj 5 622 is scheduled to move to Loc B 604. Based on this assignment, Obj 2 616 is also scheduled to move to Loc A 602 and Obj 3 618 is scheduled to move to Loc B 604. At a later time, Obj 4 620 is re-assigned to move to Loc C 606 and object 5 622 is re-assigned to move to Loc A 602.

In one scenario, Obj 2 616 and Obj 3 618 are similar in that they are interchangeable. In such a scenario, based on the re-assignment, Obj 2 616 may still be moved to Loc A 602, and meet Obj 5 622 instead of Obj 4 620. Further, Obj 3 618 may be re-assigned to move to Loc C 606 and meet Obj 4 620 at Loc C 606 instead of originally assigned Loc B 604. In another scenario, based on the estimated time of arrival of Obj 4 620 and Obj 5 622 to their re-assigned locations and the time it would take to move Obj 2 616 and Obj 3 618 to either Loc A 602 and Loc C 606, each of the Obj 2 616 and Obj 618 may be selectively assigned to move to either Loc A 602 or Loc C 606. As one skilled in the art appreciates, elevation of Loc A 602, Loc C 606, Loc P 610 and Loc Q 612 may be advantageously considered in determining the time it would take to selectively move Obj 2 611 and Obj 3 618 to Loc A 602 and Loc C 606. As an example, if Loc A 602 and Loc Q 612 have same elevation (likely indicating same floor in a building), it may be advantageous to assign Obj 3 618 to move to Loc A 602 instead of assigning Obj 2 616 to move to Loc A 602.

In another scenario, Obj 2 616 and Obj 3 618 are not similar in that they are not interchangeable. In such a scenario, based on the re-assignment, Obj 2 616 will be moved to Loc A 602, and meet Obj 5 622 instead of Obj 5 620. Further, Obj 3 618 may be re-assigned to move to Loc C 606 and meet Obj 4 620 at Loc C 606 instead of originally assigned Loc A 602. Further, Obj 4 620 is re-assigned to move to Loc A 602 to meet object 5 622.

Figure 7:
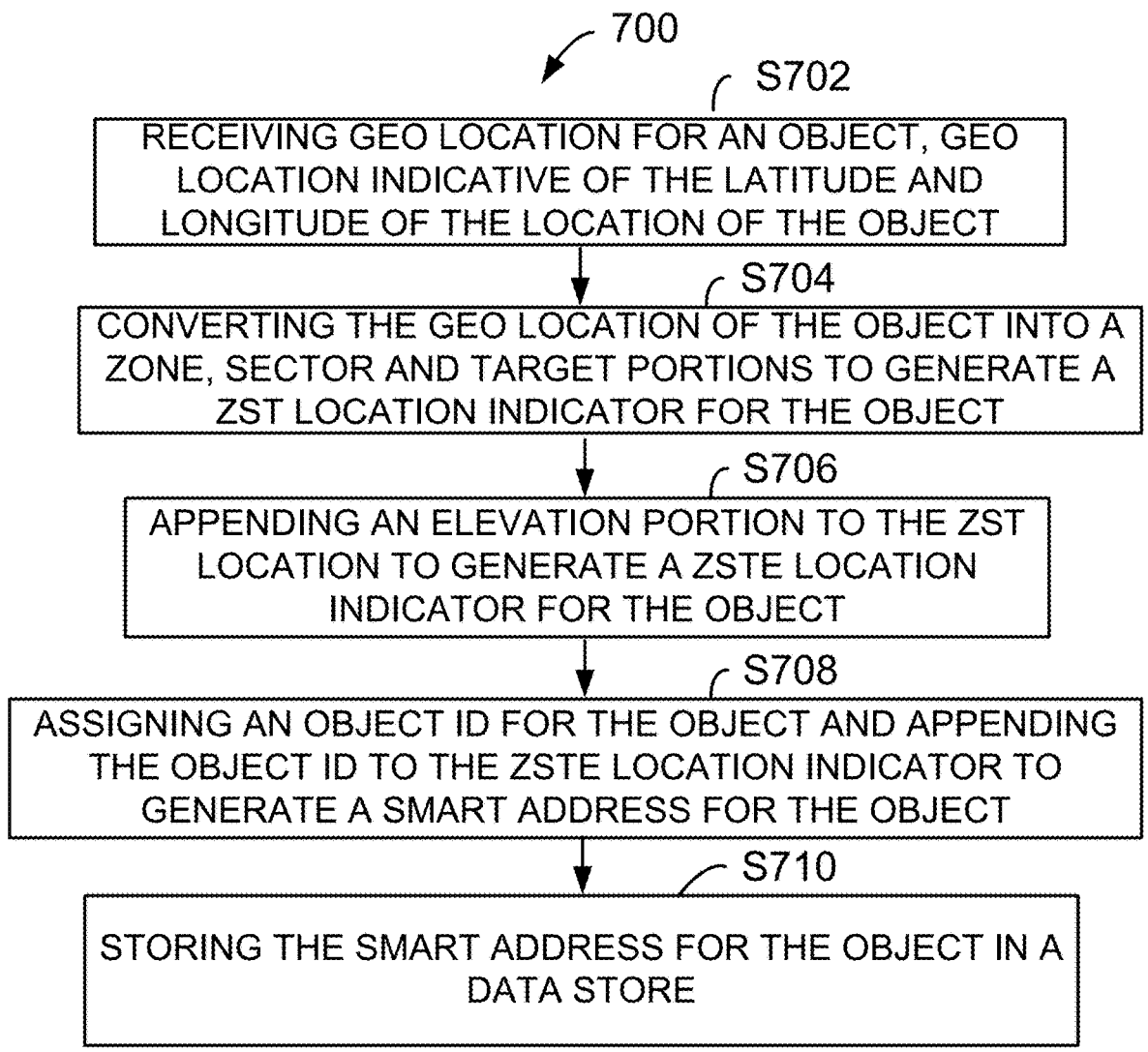
FIG. 7 shows an example flow diagram to generate ZSTE location indicator and a smart address for an object, according to an example of this disclosure.

Now, referring to FIG. 7 an example flow diagram 700 is described. In block S702, geo location for an object is received, the geo location indicative of the latitude and longitude of the location of the object. For example, the geo coordinate receiver 202 of the smart address server 108 may be configured to receive the geo location of the object, as shown and described with reference to FIG. 2.

In block S704, the geo location of the object is converted into a zone, sector and target portion to generate a ZST location indicator for the object. For example, the ZST location indicator for the object is generated by the smart address server 108, as previously described with reference to FIGS. 2, 3, 3A and 4.

In block S706, an elevation portion is appended to the ZST location indicator to generate a ZSTE location indicator for the object. For example, as described with reference to FIGS. 4A and 4B, an elevation portion is appended to the ZST location indicator to generate a ZSTE location indicator.

In block S708, an object ID for the object is assigned and the object ID is associated to the ZSTE location indicator to generate a smart address for the object. For example, as shown and described with reference to FIGS. 4A and 4B, an object ID is associated to the ZSTE location indicator to generate a smart address for the object.

In block S710, the smart address for the object is stored in a data store. For example, the generated smart address for the object is stored in a data store in the smart address server 108.

Having described various example implementations, following are some of the use cases that may be implemented using the teachings of this disclosure.

Inventory Management: Stationary objects, with their corresponding ZSTE location indicators may be advantageously managed using an inventory management system. As the location of each object is known, it will be easier to locate the object, fetch the object and selectively move the object to other locations. Further, inventory of objects may be taken with ease. In some examples, robots or autonomous vehicles may be used to selectively place the objects at a certain location, selectively retrieve the object from a stored location and selectively move the object to another location.

Movable objects with their corresponding ZSTE location indicators may help track the location of the movable object, selectively move the object from one location to another and the like. For example, in a hospital or airport setting, each of the wheelchairs may have a corresponding ZSTE location indicator. This permits the location of various wheelchairs in the facility, selectively move the wheel chairs to different locations based on the need and the like. Further, periodically reviewing the location and movement of wheelchairs to different locations may provide a pattern of usage, based on time, location and the like. Based on pattern of usage, corrective action may be taken to change the inventory of wheelchairs and location of wheelchairs needed in the facility.

Citizen reporting: In some examples, people may report problems they observe in public places, for example, missing sewer covers or leaky water pipes, clogged toilets etc, by transmitting the ZSTE location of the corresponding object needing attention. This will help the maintenance crew to specifically know the location of the object needing attention and take remedial action.

Preventive maintenance: Objects with their corresponding ZSTE location indicators may be able to self report potential problems needing attention. This will permit a maintenance personnel to visit the object and remedy the defect. In some examples, the objects may be internet of things (IOT) devices.

Fleet management: Objects in a fleet may have corresponding ZSTE location indicators assigned to them. This permits location of various objects of the fleet and deployment of various objects of the fleet for service to different location. Objects of the fleet may include vehicles like cars, vans and trucks, drones, robots and the like. By knowing the location of various objects of the fleet at different times and analyzing the usage of the objects in the fleet, a better planning and deployment of the objects in the fleet may be undertaken.

On-demand service delivery: When a recipient of service and service delivery person are both in motion, by having their corresponding ZSTE location indicator, it will be easier to coordinate service delivery. For example, based on the location of the service delivery person, instructions to get parts from a nearby location may sent to the service delivery person. If there are more than one service delivery person is available, based on the location of the recipient of service, one of the service delivery person may be selectively chosen to provide the service. In some examples, the service delivery may be delivery of goods by a vehicle or autonomous robot vehicle, instead of a person and requirements of the recipient of service, in this case, a customer may be updated in real time or dynamically, based on the location of the customer.

Transportation management: In one example, ZSTE location indicators are assigned to bus stops, buses in motion and passengers. Based on the location of the bus, its arrival at a bus stop may be updated in real time. Further, based on the number of passengers in a bus, number of available seats in a bus may be advantageously displayed at subsequent bus stops.

In another example, ZSTE location indicators may be assigned to an ambulance and various objects in the ambulance. Based on the location of the ambulance and location of a patient to be picked up, the ambulance may be selectively routed to the patient using an optimum route path. Further, any objects consumed in the ambulance to provide service to the patient may be tracked in real time, to indicate what treatment was given to the patient and which objects needs to be replenished based on the consumption of the object.

In yet another example, various wheelchairs in a hospital or an airport with their corresponding ZSTE location indicators may be tracked and selectively deployed to various service locations. In some examples, a service location may change due to changed circumstance, for example, when an airplane scheduled to dock at one gate is changed to dock at another gate. This may necessitate reevaluation of wheelchairs assigned to pick up passengers from one gate to be picked up from another gate. In some examples, another set of wheelchairs may be assigned to pick up passengers from another gate, based on the location of the another gate and availability of alternate wheelchairs in the vicinity of the another gate.

In yet another example, a vehicle may be assigned a ZSTE location indicator, with additional attributes related to the vehicle. In case of an emergency, information related to the vehicle along with its ZSTE location may be selectively transmitted to receive needed service and attention.

In some examples, a plurality of vehicles with corresponding ZSTE location indicators may be used to coordinate selective meeting of the vehicles, for example to perform trans-loading of items from one vehicle to another. Vehicles may be land based vehicles as well as drones in the air or undersea.

When a sequence of vehicles are travelling to a destination, based on the ZSTE location indicator of the vehicles, information may be shared by one vehicle with other vehicles related to delays or congestions experienced.

In some examples, based on the ZSTE location indicators of various entities, for example, people or vehicles, a proximity determination may be performed over a radial distance. For example, based on the proximity determination, people or vehicles may determine location of other people or vehicles in the vicinity. This may be advantageously used in public places like conference centers, shopping malls and airports.

Health care application: Most of the medical devices have built-in sensors. By assigning ZSTE location indicators to the medical devices, location of these medical devices may be selectively tracked in a hospital setting. Further, each of the patients may also be assigned a ZSTE location indicator, for example, using a wrist band with a sensor. By keeping track of the patients based on their ZSTE location indicator, any movement of the patients may be tracked. Similar concept may be applied to a production, manufacturing and logistics facilities to identify and track equipment used inside the facility.

The embodiments disclosed herein can be implemented through at least one software program running on at least one hardware device and performing various functions of the security appliance. Various functions of the smart address server as described herein can be at least one of a hardware device, or a combination of hardware device and software module.

The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means, and at least one software means. The method embodiments described herein could be implemented in pure hardware or partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for associating an address for an object, comprising:
   providing a smart address server, with a processor and memory, the smart address server configured to:
   receiving geo location for the object, the geo location indicative of the latitude and longitude of the location of the object;
   converting the geo location for the object into a zone, sector and target portion to generate a ZST location indicator for the object;
   appending an elevation portion to the ZST location, to generate a ZSTE location indicator for the object;

assigning an object ID for the object and appending the object ID to the ZSTE location indicator to generate a smart address for the object; and storing the generated smart address for the object in a data store, wherein, the object is indicative of a first location on a map.

2. The method of claim 1, further including appending an attribute portion to the smart address for the object, wherein the attribute portion includes one or more of the attributes associated with the object.

3. The method of claim 2, further including sending a message with the smart address for the object, the message indicative of an event at the location of the object.

4. The method of claim 3, wherein the event is a meeting, with the message indicating one or more attributes of the meeting.

5. The method of claim 3, wherein the event is an alarm, with the message indicating one or more attributes of the alarm.

6. The method of claim 3, wherein the event is indicative of an action to be taken at the location of the object.

7. The method of claim 1, further including:
receiving the smart address for the object; and
converting the smart address for the object to the geo location indicative of the latitude and longitude of the location of the object.

8. The method of claim 7, further including:
sending the geo location indicative of the latitude and longitude of the location of the object to an application configured to present an indicia of the object on a map displayed on a display device.

9. The method of claim 1, further including:
providing a first object, with a corresponding first ZSTE location indicator, wherein the first object is a mobile object located at the location of the object;
monitoring the time taken by the first object to move from the location of the object to a second location; and
generating an alert when the time taken exceeds a predefined time threshold value.

10. The method of claim 1, further including:
providing a first object, with a corresponding first ZSTE location indicator, wherein the first object is a mobile object located at the location of the object;
monitoring the movement of the first object from the location of the object to a second location; and
generating an alert when first object deviates from moving to the second location.

11. The method of claim 1, further including:
providing a first object, with a corresponding first ZSTE location indicator, wherein the first object is a mobile object;
providing a second object with a corresponding second ZSTE location indicator, wherein the second object is a mobile object;
configuring the first object and the second object to meet at the location of the object;
redirecting the second object to a second location; and
redirecting the first object to the second location based on the redirection of the second object.

12. A system to associate an address for an object, comprising:
a smart address server, with a processor and memory, the smart address server configured to:
receive a geo location for the object, the geo location indicative of the latitude and longitude of the location of the object;

convert the geo location for the object into a zone, sector and target portion to generate a ZST location indicator for the object;

append an elevation portion to the ZST location, to generate a ZSTE location indicator for the object;

assign an object ID for the object and append the object ID to the ZSTE location indicator to generate a smart address for the object; and store the generated smart address for the object in a data store, wherein, the object is indicative of a first location on a map.

13. The system of claim 12, further including append an attribute portion to the smart address for the object, wherein the attribute portion includes one or more attributes associated with the object.

14. The system of claim 13, further including sending a message with the smart address for the object, the message indicative of an event at the location of the object.

15. The system of claim 14, wherein the event is a meeting, with the message indicating one or more attributes of the meeting.

16. The system of claim 14, wherein the event is an alarm, with the message indicating one or more attributes of the alarm.

17. The system of claim 14, wherein the event is indicative of an action to be taken at the location of the object.

18. The system of claim 12, further including:
receive the smart address for the object; and
convert the smart address for the object to the geo location indicative of the latitude and longitude of the location of the object.

19. The system of claim 18, further including:
send the geo location indicative of the latitude and longitude of the location of the object to an application configured to present an indicia of the object on a map displayed on a display device.

20. The system of claim 12, further including:
a first object, with a corresponding first ZSTE location indicator, wherein the first object is a mobile object located at the location of the object;
monitor the time taken by the first object to move from the location of the object to a second location; and
generate an alert when the time taken exceeds a predefined time threshold value.

21. The system of claim 12, further including:
a first object, with a corresponding first ZSTE location indicator, wherein the first object is a mobile object located at the location of the object;
monitor the movement of the first object from the location of the object to a second location; and
generate an alert when first object deviates from moving to the second location.

22. The system of claim 12, further including:
a first object, with a corresponding first ZSTE location indicator, wherein the first object is a mobile object;
a second object with a corresponding second ZSTE location indicator, wherein the second object is a mobile object,
wherein the first object and the second object are configured to meet at the location of the object;
wherein the second object is redirected to a second location; and
based on the redirection of the second object, the first object is redirected to the second location.

* * * * *